US000001433H

United States Statutory Invention Registration [19]

[11] Reg. Number: H1433

Estes et al.

[43] Published: May 2, 1995

[54] GUN LINER REPAIR APPARATUS

[75] Inventors: Elvin G. Estes; Jon Hahne; Richard J. Hayes; Robert Hussion, all of Austin, Tex.

[73] Assignee: The United States of America as represented by the Secretary of the Army, Washington, D.C.

[21] Appl. No.: 177,828

[22] Filed: Jan. 5, 1994

[51] Int. Cl.[6] ..... B24B 1/00

[52] U.S. Cl. ..... 451/57; 451/61; 451/54; 451/58

[58] Field of Search ..... 51/281 R, 323–328

*Primary Examiner*—David Brown

[57] ABSTRACT

A gun liner repair apparatus and process for repairing a gun liner without disassembly of the gun or the liner. This apparatus includes a grinding unit for grinding away a damaged area of a liner and includes a potting unit for depositing new liner material on the damaged area of the liner.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUN LINER REPAIR APPARATUS

GOVERNMENTAL INTEREST

The invention described herein may be manufactured, used and licensed by or for the Government for governmental purposes without the payment to us of any royalties thereon.

FIELD OF THE INVENTION

The invention generally relates to a gun liner repair apparatus, and in particular the invention relates to a gun liner repair process and apparatus, which has a grinding unit and a potting unit.

BACKGROUND OF THE INVENTION

Electric guns have a liner of a composite material. During launch of a projectile, the liner can be damaged. A damaged liner can disrupt the launching of a subsequent projectile.

SUMMARY OF THE INVENTION

According to the present invention, a gun liner repair apparatus is provided. The apparatus comprises a grinding unit for grinding a damaged area of a liner, and comprises a potting unit for depositing liner material on the damaged area of the liner.

By using the gun liner repair apparatus, a damaged gun liner can be repaired; and the problem of disrupting the launching of a subsequent projectile can be avoided.

One object of the present invention is to repair a damaged gun liner.

Another object is to repair a damaged gun liner without disassembly of the gun, or the liner.

BRIEF DESCRIPTION OF THE DRAWINGS

The foregoing and other objects, features and advantages will be apparent from the following description of the preferred embodiment of the invention as illustrated in the accompanying drawings.

DESCRIPTION OF THE PREFERRED EMBODIMENT

Figure 1:
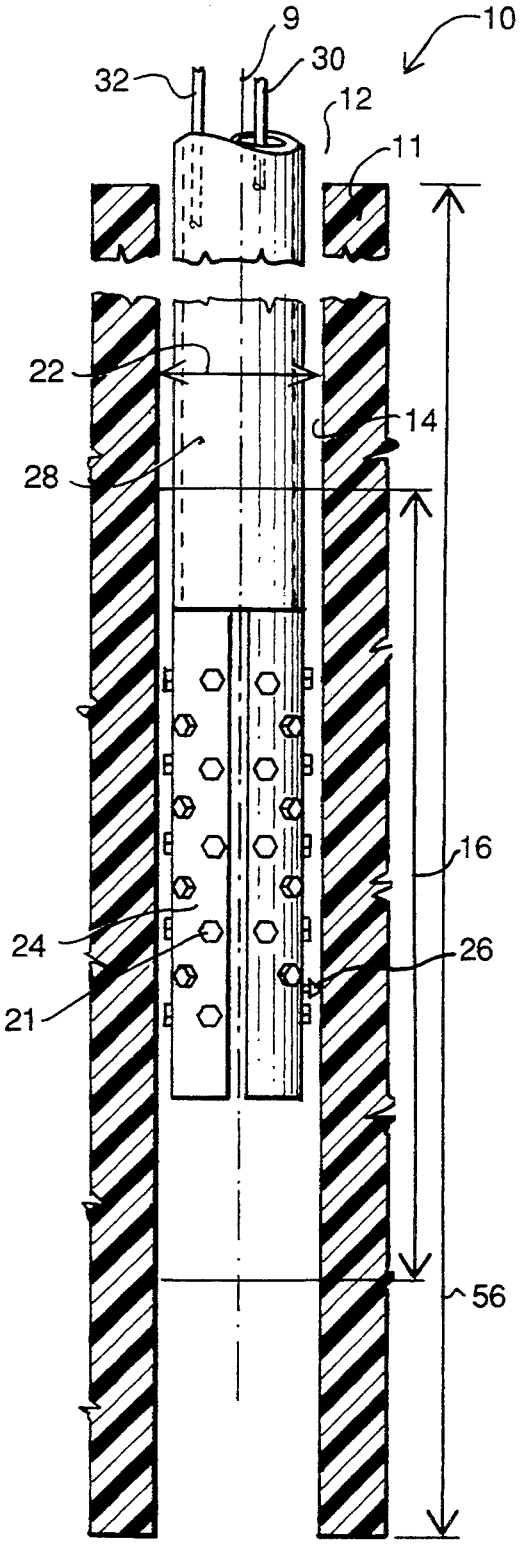
FIG. 1 is a section view of a portion of the apparatus according to the invention.
Figure 2:
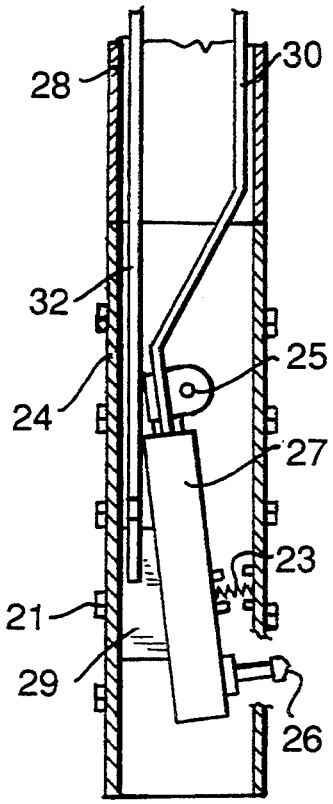
FIG. 2 is a cutaway view of a portion of FIG. 1.
Figure 3:
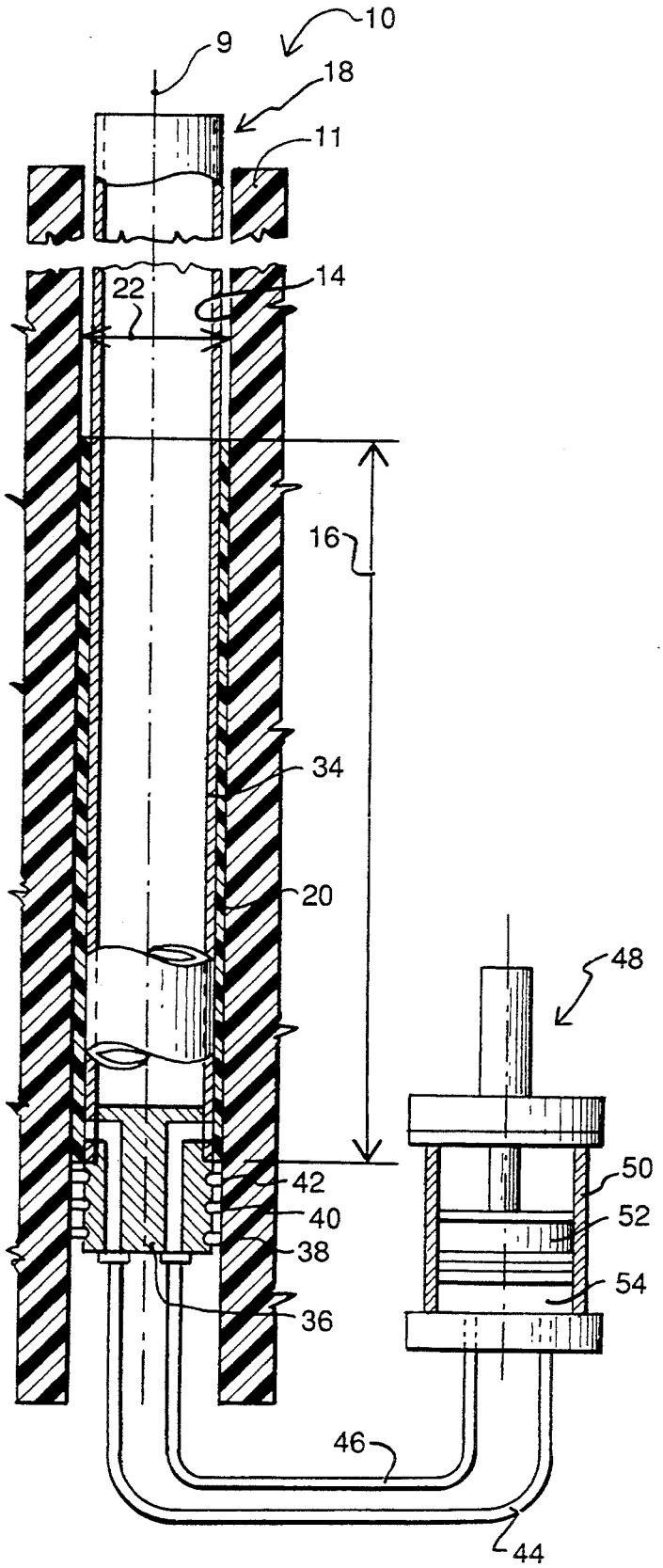
FIG. 3 is a section view of another portion of the apparatus according to the invention.

As shown in FIGS. 1 and 2, a gun liner repair device or equipment or apparatus 10 is provided. Apparatus has a grinder 12 for grinding an electric gun insulator or liner 11. Liner 11 has an axis 9. As shown in FIGS. 1 and 3, liner 11 also has a bore surface or inner surface 14, which has a damaged area as defined by a length 16. Surface is ground down by grinder 12 over the damaged area.

As shown in FIG. 3, apparatus 10 also has a forming unit or casting unit or potting unit 18, which forms an annular space and a deposit 20 on liner surface 14 along length 16. Grinder 12 first removes damaged material on inner surface 14, then potting unit 18, including a pump 48, deposits new, similar material on inner surface 14.

Deposit 20 is then honed or reamed using a conventional honing machine (not shown), in order to achieve an inner diameter 22, which is equal in size to its original undamaged size. In this way, inner surface 14 is repaired and is restored to its original size.

In this embodiment, the liner 11 is an epoxy and glass fiber composite. The deposit 20 is the same material. After deposit 20 is injected, and before honing of deposit 20, the deposit 20 is cured at about room temperature, or somewhat above room temperature.

As shown in FIGS. 1 and 2, grinder 12, which is a pneumatic type of grinder, has a multi-piece, cylindrical, housing 24, which has multiple bolt heads 21, that are adjustable for controlling the diameter of housing 24. Grinder 12 also has a single tool bit 26, which is rotatably connected to a grinding head 27 that is pivotally connected to a support pin 25 that is mounted on housing 24. Grinder 12 also has an elongate, thin wall, support pipe or tube 28, which supports housing 24. Support tube 28 has an axial key way (not shown) machined into its full length which is used in conjunction with an indexed template (not shown) at the top of the support tube to guide the grinder along axis 9 and locate it radially with respect to axis 9. Grinding head 27 has a compression spring 23 which bears against housing 24 for retracting head 27. Tube 28 is hung from an exterior support (not shown). Grinder 12 can be rotated about axis 9 or reciprocated along axis 9. Grinder 12 also has a flexible air line or pneumatic conduit 30, which passes inside tube 28 and provides power to the grinding head 27, that drives the tool bit 26. Grinder 12 also has a mechanical screw 32, which passes inside tube 28 and which connects to a wedge-shaped actuator 29 for adjusting the grinding depth of the grinder. Conduit 30 feeds pressurized air to the grinder; and mechanical screw or threaded rod 32, under manual operation, adjusts the grinding depth. Thus, grinder 12 can be adjusted in depth and rotated about axis 9 and reciprocated along axis 9.

As shown in FIG. 3, potting unit 18 has a cylindrical form or mandrel 34, which has a cylindrical plug or manifold 36. Manifold 36 has three exterior 0-ring seals 38, 40, 42, which engage surface 14. Manifold 36 also has two inlet tubes 44, 46, which supply composite material to deposit 20 at surface 14. Potting unit 18 also has a pump 48 which forces composite material through tubes 44, 46. Pump 48 has a cylinder 50 and a ram or piston 52, which form a chamber 54 that contains the composite material to be deposited.

In this embodiment, liner 11 and deposit 20 are a composite epoxy and glass fiber material. Deposit 20 has a thickness of about 0.050 to 0.100 inches. Form 34 is made of plastic material, such as polypropylene, and has a thickness of about 0.200 inches. Bore diameter 22 is about 4.00 inches. Liner 11 has an overall length 56 of about 33.0 feet. Pump 48 has a size of about 12 inches in diameter and about 24 inches in length. Form 34 has a support (not shown), which can be the support (not shown) of tube 28.

With the special tooling 10, 12, 18 developed for this process, damaged areas of insulator or liner 11 can be precisely ground away and cleaned in preparation for repair. The grinder 12 which is a 90 degree pneumatic die grinder is mounted in housing 24 with an adjustable diameter. The grinding unit 12 can be diametrically extended and retracted to control grinding depth. The grinding tool housing 24 is mounted on the end of tube 28 which is a long thin wall aluminum tube, see FIG. 1, to reach all areas of the liner 11. Pneumatic conduit 30 and mechanical control line 32 for the grinder 12 pass though the ID (inside diameter) of this tube 28. The grinder 12 is controlled from the opposite end of the long tube 28, and can be rotated and reciprocated to grind the desired areas.

Once all damaged areas have been ground and cleaned, a polypropylene tube or mandrel 34 with a bore seal and fluid manifold 36 at one end is inserted in the bore or liner 11 to provide the inside wall of an epoxy composite mold. Glass fibers and epoxy composite 20 are then pumped into the annulus between the bore ID 14 and the poly propylene mandrel 34 through the fluid manifold 36. Pumping is accomplished using pump 48, which is a four gallon capacity hydraulic pump in this embodiment. Once the annulus has been filled, the epoxy composite is cured at room temperature or with heat, depending on the epoxy composite chosen. After curing is complete, the polypropylene mandrel 34 is easily removed after chilling with liquid nitrogen. The annulus or deposit 20 of epoxy and fiber composite in the bore is then removed by honing, returning the repaired liner or insulator 11 to the original liner bore diameter.

According to the invention, a repair process is provided. This is a process of repair of a liner 11, which is made of a composite material of epoxy and glass fibers, and which has a liner surface that has a damaged area within a specific length 16. This process includes the steps of:

grinding away a damaged area of liner surface 14 within length 16;

forming an annular deposit 20 of new similar composite material of epoxy and glass fibers over the damaged area of liner surface 14 within length 16; and honing away a portion of the deposit 20 to obtain a diameter 22 which is about equal to its original diameter in size along axis 9.

The advantages of apparatus 10 are indicated hereafter.

A) Apparatus 10, and its related process, permit repair of a damaged area of a gun liner 11, which has a composite epoxy and glass fiber material, without disassembly of liner 11, or of the gun.

B) Apparatus 10, and its related process, provides repaired liner portions, which are stronger than corresponding liner portions before damage thereto.

C) Apparatus 10 avoids the need for frequent discarding of guns due to damaged liners.

D) Apparatus 10, and its process, permit repair of a damaged gun liner, thereby increasing the average lifetime of a gun.

E) Apparatus 10, and its process, avoid the problem of altering bore dimensions during gun disassembly and reassembly to facilitate a repair.

F) The use of apparatus 10 to repair a gun liner minimizes the problem of disruption of a launch of a vehicle from a gun with a damaged liner.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. Gun liner repair apparatus comprising:

a grinding unit for grinding a damaged area of a liner; and a potting unit for depositing new liner material on the damaged area of the liner.

2. The apparatus of claim 1, wherein the grinding unit comprises:

a multi-piece cylindrical housing having an axis and being radially adjustable;

a single tool bit mounted on and radially adjustable relative to the housing;

drive means for rotating the tool bit; and an elongate tube coaxially attached to the housing.

3. The apparatus of claim 2, wherein the potting unit comprises:

a cylindrical form for temporary placement inside the liner to form an annular space for a deposit of the new liner material on the damaged area of the liner;

said cylindrical form having a first end with a plug for closing the cylindrical form at the first end thereof;

said plug having a plurality of o-ring seals engaging the liner for closing the annular space at a first end thereof;

said plug having passage means from a supply chamber to the annular space for the supply of the new liner material to the annular space.

4. The apparatus of claim 3, wherein the chamber is a variable volume chamber formed between a cylinder and a piston of a pump.

5. The apparatus of claim 4, wherein the passage means has at least one pipe extending from the chamber to the annular space.

6. A process for repair of a liner including the steps of:

grinding away a damaged area of a surface of a liner within a selected length of the liner;

forming a deposit of new material over the damaged area; and honing away a portion of the deposit to obtain an inner diameter of the liner which is about equal in size to its original inner diameter before damage.

7. The process of claim 6, wherein the step of forming a deposit of new material over the damaged area includes the steps of:

placing an inner form within the liner so as to form an annular space for a deposit of the new material;

sealing one end of the annular space;

injecting the deposit into the annular space to a preselected level;

curing the deposit for a first time interval at a selective temperature;

freezing the inner form for a second time interval; and removing the inner form from the liner before honing the deposit portion.

8. The process of claim 7, wherein the step of injecting the deposit into the annular space to a preselected level includes the steps of:

pressurizing a chamber containing a supply of new material; and conducting an amount of new material from the chamber to the annular space.

* * * * *